United States Patent [19]

Arnold

[11] 4,026,017
[45] May 31, 1977

[54] CABLE TOOL

[76] Inventor: Howard Kay Arnold, 221 Ruth Ave., Venice, Calif. 90291

[22] Filed: Nov. 14, 1975

[21] Appl. No.: 631,875

[52] U.S. Cl. .................................. 30/90.6; 30/283
[51] Int. Cl.² ........................................ H02B 1/12
[58] Field of Search ................. 30/90.1, 90.6, 288, 30/293

[56] References Cited
UNITED STATES PATENTS 3,092,906   6/1963   Deering .............................. 30/90.6

Primary Examiner—Al Lawrence Smith
Assistant Examiner—Roscoe V. Parker
Attorney, Agent, or Firm—Robert J. Schaap

[57] ABSTRACT

A cable tool which is capable of cutting and stripping a sheath covering from a portion of a cable. The device comprises an outer housing formed of two substantially similarly shaped and sized housing sections which form a cavity therebetween to receive a conventional blade, as for example, a conventional razor blade. The housing is provided with a recess on one margin thereof and which is sized to receive the sheath covered cable in a direction transverse to its length. The housing is also provided with a groove in a margin of another portion of the housing and which is also sized to receive a sheath covered cable parallel to its longitudinal length. The cutting element extends into the groove and into the recess. In this way, when the cable is rotated within the recess, the cutting blade can be positionally located in order to cut the sheath member without cutting the cable. In like manner, the cable can be pulled through the groove longitudinally so that an end section of the cutting edge of the blade severs the cable into two sections. A screw-like retaining member positionally retains the cutting element, such as the blade, in the cavity and also positions the cutting element relative to the recess and to the groove.

15 Claims, 6 Drawing Figures

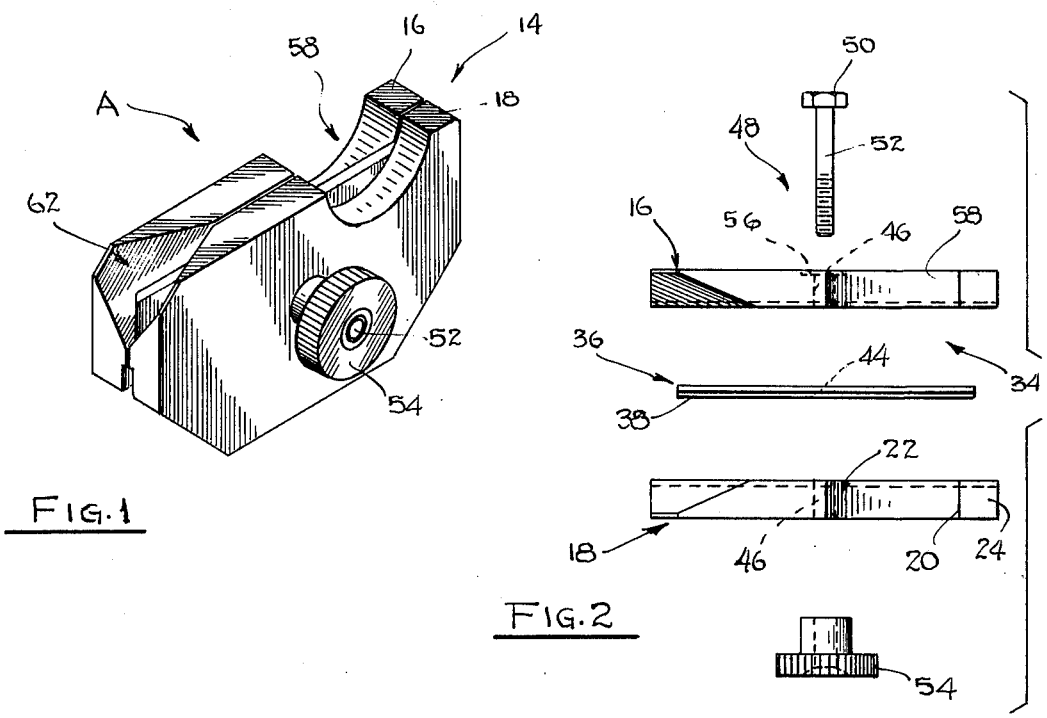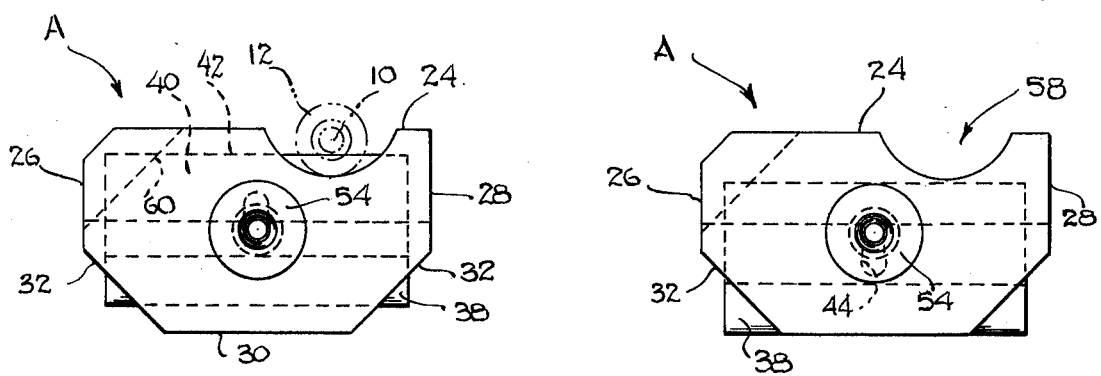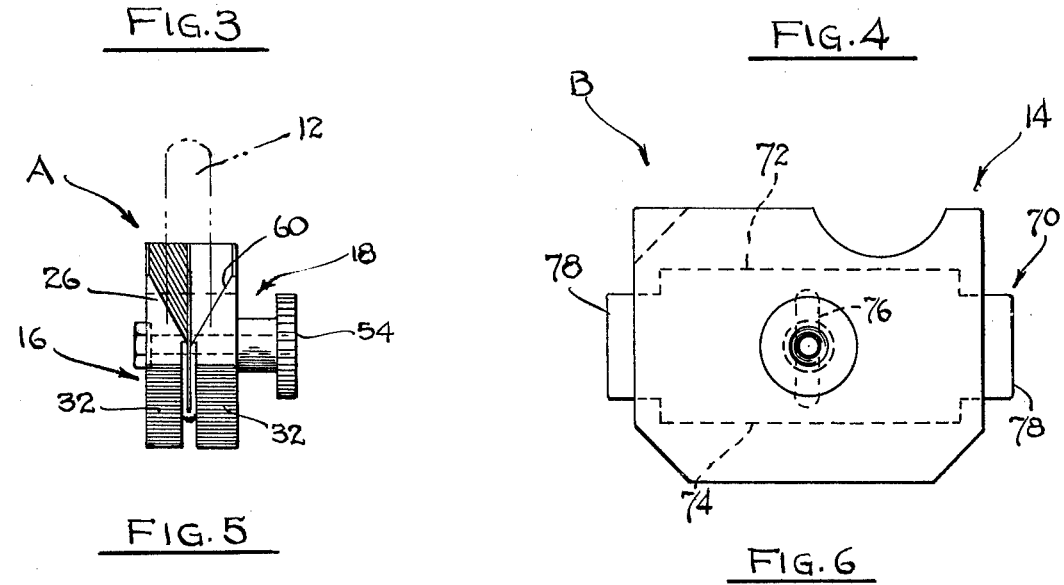

CABLE TOOL

BACKGROUND OF THE INVENTION

This invention relates in general to certain new and useful improvements in cable tools and, more particularly, to a device which is capable of cutting and enabling stripping of the sheath covering on a cable.

At present, there are a large number of cable tools which are capable of both cutting and stripping an outer sheath of a cable. These cable tools are primarily designed for use in removing the sheathing from electrical cables, although they are used in a variety of other applications. In the case of multi-cord electrical cables, that is cables which are comprised of a pair of electrical conductors and each being covered by sheaths, it is necessary to initially cut the cable into the two cord sections. Thereafter, a portion of the sheathing which surrounds two of the electrical cords is then removed so that the exposed ends of electrical cable may be connected to or may be spliced to any other electrical form of element.

For this purpose, there have been a number of available cable tools which essentially operate on the basis of a scissors-type mechanism. In these cases, the tool includes an aperture forming a recess between two opposed end engageable scissors-type elements which are capable of cutting an electrical cable or similar cable, in a direction transverse to its normal length when the cable is located in the recess of the scissors-type element. One of the primary problems with this form of sheath cutting device is that there was no provision for automatically compensating the depth of the cutting element, that is the cutting portions on each of the scissors blades, with respect to the size of the sheath, such that the cable in the sheath would not be cut by inadvertance. Consequently, while excessive care was exercised in cutting the sheath on the cable, the user of the device would often tend to cut the cable itself. Moreover, these forms of cutting devices did not include any means for cutting the cables, as for example multi-cord electrical cables, into longitudinal cable sections.

There have been other attempts to provide a commercial cable tool which is capable of both cutting and removing the sheath from a portion of a cable. Here, again, each of these devices are either capable of only cutting the cable into a multiplicity of longitudinal sections, or, otherwise, only removing a portion of the sheath from the cable. In addition to the above, there has been no device which is capable of accomplishing both functions on a highly precise basis such that the user of the device is capable of adjusting the size of the cutting element with respect to the size of the sheath so that very little skill is required in removing a sheath from a cable.

It is therefore the primary object of the present invention to provide a cable tool which includes both slicing and cutting assemblies for both cutting the sheath and stripping the sheath from a cable.

It is another object of the present invention to provide a cable tool of the type stated which includes a means of adjusting a cutting blade relative to the thickness of the sheath from the cable without cutting or otherwise damaging the cable.

It is a further object of the present invention to provide a cable tool of the type stated which can be manufactured at a relatively low unit cost and which is highly reliable in its operation.

It is an additional object of the present invention to provide a cable tool of the type stated which is capable of being adjusted to accommodate and thereby cut and strip a wide variety of cable sizes.

It is another salient object of the present invention to provide a method of both cutting and stripping the sheath surrounding a cable with a single device.

With the above and other objects in view, my invention resides in the novel features of form, arrangements, and combinations presently described and pointed out in the claims.

GENERAL DESCRIPTION

Generally speaking, the present invention relates to a cable sheath cutter and stripper device which removes a portion of a sheath surrounding a cable. This device comprises an outer housing with means forming a recess in the housing and sized to receive a sheath covered cable in such manner that the cable is transverse to its normal length. In addition, a groove is formed in the housing and is also sized to receive a sheath covered cable parallel to its longitudinal length. The housing is designed so that it is provided with a cavity therein to receive a blade-type cutting element such that the blade has a relatively long cutting edge capable of extending into the recess. In this way, the blade is capable of cutting the sheath during positional rotation of the cable in the recess. Moreover, one end of the cutting edge of this blade-type cutting element extends into the groove so that it is capable of severing the cable and the sheath into a plurality of longitudinal sections during pulling of the sheath cable in the groove parallel to its longitudinal axis. Finally, the device of the present invention includes a positioning and retaining means to removably retain the cutting element in the cavity. Moreover, this last named means positions the cutting element so that the cutting element can be positionally located in the groove and in the recess, and can be removed from the groove and the recess.

The device of the present invention can also be further characterized in that the housing is comprised of two substantially identically shaped and sized mating housing sections which form the internal cavity therebetween. In this case, the cutting element is conventional razor blade. Moreover, the blade may be provided with a somewhat centrally located aperture. Thus, the retaining and positioning means comprises a screw-like element which extends through the housing sections and the aperture in the blade.

In one embodiment of the present invention, the blade may be a single cutting edged razor blade. In another embodiment of the present invention, the blade may be a double cutting edged razor blade. In either of these embodiments, the housing is sized and shaped to accommodate each of the individual blades.

In a further preferred aspect of the present invention, the cable is a multi-cord electrical cable where each cable is provided with an outer sheath. However, the present invention is useful with a wide variety of sheath covered cables and include structural steel cables which are provided with an outer sheath and the like. For the purposes of the present invention, the term "cable" will include all forms of cables including structural cables, electrical cables and the like. The sheathing around the cable will include either an insulating sheathing, as in electrical cables, or otherwise a protective sheathing which may be removed before use.

The present invention also provides a method of cutting and slicing an outer covering sheath and stripping the sheath from a cable. In essence, this method utilizes the device as aforesaid such that the device has a recess to receive the sheath covered cable and a groove to also receive the sheath covered cable and thereby provide the combined function of cutting the sheath around the cable and slicing the sheath and stripping the sheath from the cable.

BRIEF DESCRIPTION OF THE DRAWINGS

Having thus described the invention in general terms, reference will now be made to the accompany drawings in which:

FIG. 1 is a perspective view of a cable tool constructed in accordance with and embodying the present invention;

FIG. 2 is an exploded top plan view showing the components of the cable tool of the present invention;

FIG. 3 is a side elevational view of the cable tool of FIG. 1, partially shown in phantom lines;

FIG. 4 is a side elevational view, similar to FIG. 3, and showing the blade-type cutting mechanism of the device in the recessed and housed position;

FIG. 5 is an end elevational view, partially shown on phantom lines, of the cable tool of the present invention; and FIG. 6 is a side elevational view, similar to FIG. 3, and showing a modified form of cable tool of the present invention.

DETAILED DESCRIPTION

Referring now in more detail and by reference characters to the drawings which illustrate preferred embodiments of the present invention, A designates a cable tool which is capable of cutting and stripping an outer covering sheath from a cable. In this case, the cable may adopt those forms as previously described and the sheath will also adopt those protective coverings which may be structural or environmental coverings or electrically resistive coverings. Moreover, in the case of the present invention, the term "cable tool" will be used in a generic sense to refer to the device herein which is both capable of cutting the sheath around the cable, that is forming a cut in the cable in an axis substantially transverse to the longitudinal dimension of the cable, and slicing the sheath, that is also cutting the sheath in the longitudinal dimension and thereafter splicing, i.e., removing a portion of the sheath cut with respect to the end thereof.

In this case, the cable is designated by the phantom lines of reference numeral 10 and the outer sheath covering the cable is designated by reference numeral 12. In this respect, the cable could adopt any form of metallic cable, or otherwise reinforced plastic cable or the like. The sheath 12 is essentially a plastic material, or otherwise a material which is capable of being cut by a conventional cutting blade, as for example, a razor blade.

The cable tool A of the present invention comprises an outer housing 14 which includes a pair of substantially identically sized and shaped housing sections 16 and 18, as more fully illustrated in FIG. 1 of the drawings. In this case, the housing sections 16 and 18 can be formed of any of a number of known materials, and preferably plastic or synthetic resin materials. In this case, the housing sections 16 and 18 could be molded from any of a number of known plastic materials, such as polyethylene, polystyrene, polybutadiene or copolymers thereof, or the like. Thus, these housing sections 16 and 18 could be blow-molded, thermoformed, injected-molded or thereby formed in any other known plastic molding operation. In a like manner, these housing sections could also be formed of a number of known metals, including aluminum, steel, or the like.

Each housing section 16 and 18 comprises an outer wall 20 and opposed planar and relatively flat inner walls 22. Moreover, each housing section includes a top wall 24 merging into a relatively flat left end side wall 26 and a right end side wall 28. Each of the side walls 26 and 28 merge into a bottom wall 30 through tapered connecting ends 32, in the manner as illustrated in FIGS. 1-3 of the drawings.

When each of the interior flat walls 22 are disposed in juxtaposition with respect to each other, such as illustrated in FIGS. 1 and 5 of the drawings, the two housing sections 16 and 18 form an internal cavity 34 which is sized to receive a conventional razor blade designated by reference numeral 36. In this case, the razor blade 36 is a single cutting edged razor blade and includes a relatively thick finger-engaging portion 38 which, in this case, is located in the lowermost position, and a blade section 40 having an upper cutting edge 42. Razor blades of this type are normally provided with an elongate, somewhat centrally located and vertically extending aperture 44.

Each of the housing sections 16 and 18 are provided with aligned apertures 46 which also align with the central elongate aperture 44 in the razor blade when the two housing sections 16 and 18 are secured together in aligned and marginally registered positions, as in the manner as illustrated in FIG. 1.

The conventional razor blade 36 is secured between the two housing sections 16 and 18 when the two housing sections are located in juxtaposition to each other and closely engage the razor blade 36 in the manner as illustrated in FIG. 1, by means of a conventional screw 48, which includes an enlarged head 50 and a threaded shank 52. In this case, it can be observed by reference to FIG. 2 of the drawings that the shank 52 extends through the aligned aperture 46 in the housing sections 16 and 18 and in the elongate aperture 44 of the razor blade 36. Moreover, the outer end of the shank 52 will extend through the housing section 18 and a knurled nut or knob 54 can be threadedly secured thereto. The head 50 is preferably a hexagonally shaped head, or otherwise a noncircular head which is capable of fitting in a recess 56 formed in the outer end wall 20 of the housing section 16. In this way, when the knurled knob 54 is rotated to either tighten the position of the blade 36 or release the position of the blade 36 relative to the two housing sections 16 and 18, the screw 48 will not rotate.

The housing 14 is provided with a somewhat semi-cylindrically shaped recess 58 in each of the top walls 24 of the two housing sections 16 and 18 in order to accommodate the sheathed cable 10, in a direction transverse to the longitudinal axis of the housing 14. In this respect, it can be observed that the cutting edge 42 of the blade 36 can be adjustably positioned to extend upwardly into the recess 58 so as to have a depth equal to the thickness of the sheath 12. Moreover, this adjustable positioning can be accomplished by releasing the knurled knob 54 and raising or lowering the cutting edge of the blade 36 within the recess 58. When the desired height has been achieved, the sheath covered cable 10 is pushed down into the recess and onto the cutting edge 42 of the blade 36. Thus, by merely rotating the sheath covered cable 10 in the recess 58, it is possible to permit the cutting edge 42 to extend through the sheath 12 and to merely cut the sheath 12 without cutting the cable 10. Obviously, for different size sheath thicknesses, the position of the blade can be adjusted by merely loosening the knurled knob 54 and shifting the blade 36 downwardly or upwardly. For this purpose, the lower end of the blade, that is the portion of the blade having the thick head 38, extends through the tapered end sections 32. In this way, the user of the device can merely grasp the opposed head sections 38 extending through the housing 14 and thereby positionally shift the blade 36 within the housing 14.

Each of the housing sections 14 and 16 are provided with tapered sections 60 which are both tapered inwardly and downwardly in order to form an elongated groove 62 in the manner as illustrated in FIGS. 1 and 5 of the drawings. Moreover, it can be observed by reference to FIGS. 1 and 3 of the drawings that when the cutting blade 36 is properly positioned, one corner margin of the blade extends into the elongated groove 62. Thus, by longitudinally positioning a sheath covered cable 10 in the groove and pulling the same normal to the angle of the planes defined by the tapered wall 60, it is possible to sever the cable along a central longitudinal axis. Thus, in the case of an electrical cable containing two sheath covered conductors, it is possible to split the cable into two separate sheath covered conductors. Moreover, and again, it should be noted that the position of the edge portion of the cutting blade can be adjustably positioned by merely shifting the blade about its central elongate aperture 44 by merely releasing and locking the knurled knob 54.

When the device A of the present invention is not in use, the cutting blade can be positionally shifted so that the cutting edge 42 and the end portions thereof are located entirely within the cavity 34, such as illustrated by FIG. 4 of the drawings. Thus, the device of the present invention is capable of adjustably positioning the cutting blade to provide both a cutting action and a stripping action, and also positionally locating the blade within the housing 14 so that inadvertant injury does not result. In this same respect, it is to be noted that while the present invention is designed to be used with conventional-type razor blades, the invention is not so limited, and that any type of cutting blade could be employed in connection with the present invention.

One of the unique aspects of the present invention is that when the portions of the blade located within the recess 58 and elongated groove 62 have been dulled by continued use, the blade can be merely rotated 180° about its vertical axis so that a portion of the blade not previously used in the recess 58 and groove 62 can then be used for further cutting. In this way, the life of the cutting blade can be extended considerably.

If desired, the device of the present invention may be provided with an inwardly extending pin 66 on the interior wall 22 of the housing section 16 which is located to extend into a recess 68 on the wall 62 of the housing section 18. In this way, the housing section 16 and 18 will not rotate with adjustments of the screw 48. The pin 66 and recess 68 are located above the uppermost position of the blade 36 so as not to interfere with the operation of the device.

FIG. 6 represents a modified form of cutting device B of the present invention which is similar in its construction and operation of the device A illustrated in FIG. 1. The device B, illustrated in FIG. 6, also includes the same outer housing sections. However, in this case, the housing 14 is constructed with a somewhat smaller length, that is the longitudinal dimension or length, and a somewhat larger height. This device B is primarily designed for use with double cutting edged blades. In this respect, it should be observed that the double cutting edged blades are similar in their construction to the single edged blades, except that the double cutting edged blades, designated by reference numeral 70, employ a pair of cutting edges 72 and 74 on opposite sides thereof. In like manner, these blades similarly include an elongate central aperture 76 similar to the elongate central aperture 44 in the blade 36. Moreover, the double edged blades usually include a pair of longitudinally extending tabs 78. In this way, the user of the device can merely grasp the tabs 78 and shift the blade 70 vertically upwardly or downwardly within the housing 14. Inasmuch as the housing 14 has a greater height, the lower cutting edge 74 will not extend through the lower end of the housing and, in this way, the construction is designated to eliminate any injury to the user of the device. In the same respect, it should be observed that the housing could be constructed with a height similar to the housing 14, as illustrated in FIG. 1, and also provided with a recess 58 on its lower margins for purposes of providing an extra cutting recess.

It should be observed in connection with the present invention that one of the unique aspects of this invention is that the device can be constructed with essentially two housing sections and a fastening mechanism, as for example, including the screw 48 in the knurled knob 54. Thus, the device is not only simple in its construction, but easy to operate and be constructed at a relatively low unit cost. Moreover, the device is so uniquely designed that one merely positions the cutting blade at a precise location in order to cut the sheath or to slice the sheath as desired without otherwise injuring the cable.

Thus, there has been illustrated and described a unique novel cable tool which fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letters patent is:

1. A cable sheath cutter and stripper device for removing a portion of a sheath covering a cable, said device comprising:
 a. an outer housing,
 b. means forming a recess in said housing and sized to receive a sheath covered cable transverse to its length,
 c. means forming a groove in another portion of said housing and also being sized to receive a sheath covered cable parallel to its length,
 d. means forming a cavity in said housing to receive a blade-type cutting element of the type including a relatively long sharp cutting edge and a non-sharp grasping section capable of being grasped by the fingers of the user of said device, said blade being positionable in said housing so that said relatively long cutting edge is capable of extending into said recess in order to permit cutting the sheath during positioned rotation of the cable in the recess; one end of said cutting edge extending into said groove so that it is capable of severing the cable and sheath into a plurality of longitudinal sections during pulling of the sheathed cable in the groove parallel to its longitudinal axis, e. retaining and positioning means to removably retain said cutting element in said cavity and position said cutting element so that said cutting edge can be positionally located in said groove and said recess, and f. said housing being shaped so that a pair of opposed portions forming part of said grasping section protrude outwardly of said housing so that said opposed portions can be grasped by the fingers of the user of said device without contact with the sharp cutting edge to positionally locate the cutting edge relative to said recess and said groove, said housing also having a sufficient size and shape so that all portions of said cutting edge can be retracted in said housing such that all portions of said cutting edge are unexposed in said groove and said recess.

2. The cable sheath cutting and stripping device of claim 1 further characterized in that said housing is comprised of two substantially identically shaped and sized mating housing sections which form said internal cavity therebetween.

3. The cable sheath cutting and stripping device of claim 2 further characterized in that said cutting element is a conventional razor blade.

4. The cable sheath cutting and stripping device of claim 3 further characterized in that said blade is provided with a somewhat centrally located aperture, and said retaining and positioning means comprises a screw-like member which extends through said housing section and the aperture in said blade.

5. The cable sheath cutting and stripping device of claim 3 further characterized in that said blade is a single cutting edged razor blade with said cutting edge being formed on one longitudinal margin thereof and said grasping section comprised of a thicker portion on an opposite longitudinal margin thereof, and where said opposed portions comprise opposite ends of said thicker portion which extend outwardly from opposite sides of said housing.

6. The cable sheath cutting and stripping device of claim 3 further characterized in that said blade is a double cutting edged razor blade with at least one cutting edge on one longitudinal margin thereof protruding into said recess and groove, and where said opposed portions comprise opposite outwardly projecting side portions of said blade which extend outwardly from opposite sides of said housing.

7. The cable sheath cutting and stripping device of claim 2 further characterized in that said cable is a multicord electrical cable where each cable is provided with an outer sheath.

8. A method of cutting and stripping an outer covering sheath from a cable with a cutter and stripper device having a housing with a recess to receive a sheath covered cable and a groove in said housing to also receive said sheath covered cable, said method comprising:

a. adjustably positioning a blade having a relatively sharp cutting edge and a non-sharp grasping section capable of being grasped by the fingers of an individual using said device in a housing forming part of said device so that said cutting edge extends into said recess in a depth sufficient to cut said sheath without cutting said cable, b. locating a sheath covered cable in said recess and pressing down on said cable and simultaneously rotating said cable so that said cutting edge cuts said sheath with a circular cut surrounding said sheath, c. positioning an edge of said blade to extend into said groove with a depth sufficient to cut said cable into longitudinal sections, d. locating said sheath covered cable in said groove and pressing down on said cable and simultaneously pulling said cable in its longitudinal dimension so that the edge of said blade cuts said cable into longitudinal sections; and e. permitting projection of a pair of opposed spaced portions of said grasping section to protrude outwardly of said housing sufficiently so that said opposed spaced apart portions may be grasped by the fingers of an individual without contact with the relatively sharp cutting edge to positionally locate the cutting edge relative to the recess and the groove, and enabling the user to grasp the opposed spaced apart portions of said grasping sections to shift said blade to a position in said housing so that said cutting edge is unexposed to said groove and said recess.

9. The method of claim 8 further characterized in that the blade is provided with an elongate aperture and is positioned by means of a screw-like device which releasably locks two housing sections together.

10. The method of claim 8 further characterized in that the blade is a conventional razor blade.

11. A cable sheath cutter and stripper device for removing a portion of a sheath covering a cable, said device comprising:

a. an outer housing comprised of a pair of housing sections, each of said housing sections having a relatively flat outer wall and a relatively flat inner wall with a relatively straight upper wall, a spaced apart relatively straight lower wall and opposed relatively straight end walls, each of said end walls merging into said lower walls through tapered wall sections, the upper and lower walls and the spaced apart end walls being marginally registrable with each other so that said housing sections are essentially mirror imaged with respect to one another, b. means forming an arcuately shaped recess in the upper walls of said housing and sized to receive a sheath covered cable transverse to the length of the housing sections, c. opposed inwardly and downwardly tapering wall sections extending between the upper walls and one of the end walls of each of said housing sections and which tapering wall sections are spaced apart from each other and are essentially marginally registered with each other forming a groove in another portion of said housing and also being sized to receive a sheath covered cable parallel to the length of the housing sections, d. said inner walls being capable of being spaced apart from each other sufficient to receive a blade-type cutting element of the type including a relatively long sharp cutting edge and a non-sharp grasping section capable of being grasped by the fingers of the user of said device, said blade being positionable in said housing so that said relatively long cutting edge is capable of extending into said recess in order to permit cutting the sheath during positioned rotation of the cable in the recess by merely pressing on the cable with a finger and rotating the housing on the cable relative to one another; one end of said cutting edge extending into said groove so that it is capable of severing the cable and sheath into a plurality of longitudinal sections during pulling of the sheathed cable in the groove parallel to its longitudinal axis, e. retaining and positioning means to removably retain said cutting element in said cavity and position said cutting element so that said cutting edge can be positionally located in said groove and said recess, and f. said housing being shaped so that a pair of opposed portions forming part of said grasping section protrude outwardly of said housing so that said opposed portions can be grasped by the fingers of the user of said device without contact with the sharp cutting edge to positionally locate the cutting edge relative to said recess and said groove, said housing also having a sufficient size and shape so that all portions of said cutting edge can be retracted in said housing such that all portions of said cutting edge are unexposed in said groove and said recess.

12. The cable sheath cutting and stripping device of claim 11 further characterized in that said cutting element is a conventional razor blade.

13. The cable sheath cutting and stripping device of claim 12 further characterized in that said blade is provided with a somewhat centrally located aperture, and said retaining and positioning means comprises a screw-like member which extends through said housing section and the aperture in said blade.

14. The cable sheath cutting and stripping device of claim 12 further characterized in that said blade is a single cutting edged razor blade with said cutting edge being formed on one longitudinal margin thereof and said grasping section comprised of a thicker portion on an opposite longitudinal margin thereof, and where said opposed portions comprise opposite ends of said thicker portion which extend outwardly from opposite sides of said housing.

15. The cable sheath cutting and stripping device of claim 12 further characterized in that said blade is a double cutting edged razor blade with at least one cutting edge on one longitudinal margin thereof protruding into said recess and groove, and where said opposed portions comprise opposite outwardly projecting side portions of said blade which extend outwardly from opposite sides of said housing.

* * * * *